Patented Aug. 7, 1945

2,381,843

UNITED STATES PATENT OFFICE 2,381,843

PURIFICATION OF SAND AND OTHER MINERALS FROM IRON

Albert Sherlock, Rainford, England, assignor to Pilkington Brothers Limited, Liverpool, England, a company of Great Britain No Drawing. Application September 29, 1942, Serial No. 460,145. In Great Britain November 7, 1941

13 Claims. (Cl. 23—182)

This invention relates to the reduction of the quantity of iron impurities in sand and other minerals.

Before sand is used in commercial processes, as for example in the manufacture of glass, it is usually washed in water to remove silt associated with the sand grains and as a result the sand is purified of the iron containing impurities like clay, but the very tenacious film, which contains iron, on the grains is left unaffected.

Alumina, felspar, calcite, dolomite, magnesite, fluorspar or cryolite used in the manufacture of glass, may contain deposited iron which, in the ground mineral provides an undesirable quantity of iron oxide in the batch used in making glass.

There have already been proposed mechanical processes of removal and various chemical methods of attacking the tenacious film, which contains iron, on sand in order to purify the sand by removing the iron present in the ferruginous film.

The main object of the present invention is to provide an improved process of decreasing the iron content of the minerals above specified, in particular sand, which is simple and economical to operate.

A particular object is to obtain in an economic manner sand for use in the manufacture of optical glass from sand which, because of its iron content would otherwise be unusable for that purpose.

In accordance with the present invention the quantity of iron impurity is decreased in sand, alumina, felspar, calcite, dolomite, magnesite, fluorspar or cryolite, by soaking the mineral in a dilute solution of titanous sulphate or chloride in which solution an inorganic fluorine compound is incorporated, such as for example hydrofluoric acid, sodium fluoride or sodium silicofluoride and then washing the treated mineral.

The titanous sulphate is obtainable commercially in soluble form in the mixture known as 15% titanous sulphate solution.

It is believed that the action of the solution containing the titanous salt and fluorine is due to a compound of the two elements titanium and fluorine, probably a fluotitanate, and experiments have shown that the substitution of a titanic salt for the titanous salt does not produce an operable process.

The soaking treatment has the effect that the iron can be washed out of the mineral. This washing is preferably effected in continuation of the chemical treatment.

In processes according to the invention the fluorine compound may be incorporated in the solution in which soaking is effected as sodium silicofluoride which, on addition of sodium hydroxide, forms sodium fluoride in the solution, or on the addition of sulphuric acid forms hydrofluoric acid.

In a preferred form of the process, as applied to the purification of sand to be used in the manufacture of glass, the purification is effected by employing titanous sulphate with a dilute solution of hydrofluoric acid. To this end the sand, which has been previously washed with water in normal manner, is placed with fresh water and titanous sulphate into a first compartment, 60 gallons of water being used per ton of sand, this being approximately the minimum quantity of water required to make the sand flow. For each ton of sand 80 fluid ounces of the mixture known commercially as 15% titanous sulphate solution is added in the first compartment, and the sand and aqueous titanous solution thoroughly mixed in the first compartment. The mixture is then transferred to a second compartment, for example by a bucket wheel and chute, and hydrofluoric acid is added to the mixture of sand and titanous solution in the second compartment, at the rate of 80 fluid ounces of commercial hydrofluoric acid (about 60% HF) per ton of sand treated. After thorough mixing in the second compartment, the mixture is removed to a third compartment by a bucket wheel and chute, and is here again mixed. A treatment time of ten minutes per cwt. of sand in each compartment has been found suitable. The thoroughly soaked sand is then washed in water in order to remove the iron from the sand. The sand, after being treated in the third compartment, is directly conveyed into washing compartments so that the treated sand is quickly subjected to the separating treatment, thereby eliminating the possibility of the iron oxidising and sticking to the grains.

Moreover, it will be appreciated that the compartments, and the means of conveying the sand from one compartment to the next during the purification treatment, must be made of, or sheathed or lined in, material, for example wood, which will not be attacked by the chemical solutions employed.

The preliminary treatment with the titanous salt has been found convenient but is not essential except when sodium silicofluoride is employed, since the water washed sand may be subjected from the outset of the treatment to the action of the weak aqueous solution containing the titanous salt and fluorine compound.

When sodium silicofluoride is used in place of hydrofluoric acid, the sand is first subjected to the action of titanous sulphate in one treating compartment and then in a subsequent treating stage to the action of the sodium silicofluoride in solution with titanous sulphate.

The invention comprises not only the processes of purification herein referred to, but also the products produced by the process.

By way of example, a sand unsuitable for the manufacture of optical glass by reason of containing 0.012% of iron after water washing, was found to contain only 0.005% of iron after the purification treatment, first by a dilute solution of titanous sulphate at atmospheric temperature, then in a dilute solution of titanous sulphate to which has been added dilute hydrofluoric acid and then water washing. Also the iron content of a sample of fluorspar which contained 0.37% of iron was reduced to 0.039% and that of a sample of felspar which contained 0.50% of iron was reduced to 0.30%, the fluorspar and felspar being ground so that any iron containing fissures are exposed to the treatment.

Although in the particular description herein given reference is made to the first, second and third compartments, this is only indicative of stages of treatment and the process may be carried out by using two or more first, second or third compartments, as will be well understood by those skilled in the art of washing sand, and compartments are preferably provided for a preliminary washing, as well as for the final washing so that the purified mineral can be produced in one continuous process.

The process herein described may, in accordance with the invention, be used to reduce the iron content of sand for all kinds of glass manufacture.

In accordance with the invention the sand can be water washed to remove the clay like materials, and then treated with the titanous salt and fluorine compound solutions to loosen the ferruginous coating, and finally washed to separate the iron from the sand in one continuous process by arranging the required number of compartments and conveying means to traverse the sand through the several stages.

From the foregoing it will be observed that the present invention provides a simple and economical process of decreasing the quantity of iron impurity present in the coating usually found on the grains or particles of sand and the other minerals referred to herein.

I claim:

1. A process of decreasing the quantity of iron impurity in a mineral of the group consisting of sand, alumina, felspar, calcite, dolomite, magnesite, fluorspar and cryolite, including the steps of soaking the mineral in a dilute solution of a titanous salt in which solution an inorganic fluorine compound is incorporated and washing the treated mineral to remove iron released from the mineral by the soaking treatment.

2. A process of decreasing the quantity of iron impurity in a mineral of the group consisting of sand, alumina, felspar, calcite, dolomite, magnesite, fluorspar and cryolite, including the steps of soaking the mineral in a dilute solution of titanous sulphate in which solution an inorganic fluorine compound is incorporated and washing the treated mineral to remove iron released from the mineral by the soaking treatment.

3. A process of decreasing the quantity of iron impurity in a mineral of the group consisting of sand, alumina, felspar, calcite, dolomite, magnesite, fluorspar and cryolite, including the steps of soaking the mineral in a dilute solution of titanous chloride in which solution an inorganic fluorine compound is incorporated and washing the treated mineral to remove iron released from the mineral by the soaking treatment.

4. A process of decreasing the quantity of iron impurity in a mineral of the group consisting of sand, alumina, felspar, calcite, dolomite, magnesite, fluorspar and cryolite, including the steps of soaking the mineral in a dilute solution of titanous sulphate in which solution an inorganic fluorine compound is incorporated and washing the treated mineral to remove iron released from the mineral by the soaking treatment, the fluorine compound being added to the treating solution by adding sodium silicofluoride and sodium hydroxide to the treating solution.

5. A process of decreasing the quantity of iron impurity in a mineral of the group consisting of sand, alumina, felspar, calcite, dolomite, magnesite, fluorspar and cryolite, including the steps of soaking the mineral in a dilute solution of titanous chloride in which solution an inorganic fluorine compound is incorporated and washing the treated mineral to remove iron released from the mineral by the soaking treatment, the fluorine compound being added to the treating solution by adding sodium silicofluoride and sodium hydroxide to the treating solution.

6. A process of decreasing the quantity of iron impurity in a mineral of the group consisting of sand, alumina, felspar calcite, dolomite, magnesite, fluorspar and cryolite, including the steps of soaking the mineral in a dilute solution of titanous sulphate in which solution an inorganic fluorine compound is incorporated and washing the treated mineral to remove iron released from the mineral by the soaking treatment, the fluorine compound being added to the treating solution in the form of sodium silicofluoride and the mineral being given a preliminary treatment by the titanous salt solution.

7. A process of decreasing the quantity of iron impurity in a mineral of the group consisting of sand, alumina, felspar, calcite, dolomite, magnesite, fluorspar and cryolite, including the steps of soaking the mineral in a dilute solution of titanous chloride in which solution an inorganic fluorine compound is incorporated and washing the treated mineral to remove iron released from the mineral by the soaking treatment, the fluorine compound being added to the treating solution in the form of sodium silicofluoride and the mineral being given a preliminary treatment by the titanous salt solution.

8. A process of decreasing the quantity of iron impurity in a mineral of the group consisting of sand, alumina, felspar, calcite, dolomite, magnesite, fluorspar and cryolite, including the steps of soaking the mineral in a dilute solution of titanous sulphate in which solution an inorganic fluorine compound is incorporated and washing the treated mineral to remove iron released from the mineral by the soaking treatment, the fluorine compound being introduced to the treating solution by adding sodium silicofluoride and sulphuric acid thereto.

9. A process of decreasing the quantity of iron impurity in a mineral of the group consisting of sand, alumina, felspar, calcite, dolomite, magnesite, fluorspar and cryolite, including the steps of soaking the mineral in a dilute solution of titanous chloride in which solution an inorganic fluorine compound is incorporated and washing the treated mineral to remove iron released from the mineral by the soaking treatment, the fluorine compound being introduced to the treating solution by adding sodium silicofluoride and sulphuric acid thereto.

10. A process of decreasing the quantity of iron impurity in a mineral of the group consisting of sand, alumina, felspar, calcite, dolomite, magnesite, fluorspar and cryolite, including the steps of soaking the mineral in a dilute solution of titanous sulphate in which solution an inorganic fluorine compound is incorporated and washing the treated mineral to remove iron released from the mineral by the soaking treatment, the treatment being effected first with the solution known commercially as 15% titanous sulphate solution and then with the said solution with the addition of dilute hydrofluoric acid.

11. A process of decreasing the quantity of iron impurity in a mineral of the group consisting of sand, alumina, felspar, calcite, dolomite, magnesite, fluorspar and cryolite, including the steps of water washing the mineral, soaking the washed mineral in a dilute solution of titanous sulphate in soluble form in which solution an inorganic fluorine compound is incorporated and again water washing the treated mineral to remove iron released from the mineral by the soaking treatment.

12. A process of decreasing the quantity of iron impurity in a mineral of the group consisting of sand, alumina, felspar, calcite, dolomite, magnesite, fluorspar and cryolite, including the steps of water washing the mineral, subjecting the mineral to a dilute solution of titanous sulphate in soluble form, soaking the mineral in a dilute solution containing the titanous sulphate and hydrofluoric acid and again water washing the treated mineral to remove iron released from the mineral by the soaking treatment.

13. A process of decreasing the quantity of iron impurity present in the ferruginous film on sand, including the steps of water washing the sand, then subjecting the washed sand to a dilute solution of the salt known commercially as 15% titanous sulphate, soaking the sand in a solution of the said titanous sulphate to which has been added dilute hydrofluoric acid and again water washing the treated sand to remove iron released from the said film by the soaking treatment.

ALBERT SHERLOCK.